F. W. MILLER.
DELIVERY WAGON.
APPLICATION FILED MAY 21, 1908.

935,121.

Patented Sept. 28, 1909.

Witnesses
C. E. Hunt.
C. H. Griesbauer.

Inventor
F. W. Miller,
by H. R. Wilson
Attorney

UNITED STATES PATENT OFFICE.

FRED W. MILLER, OF MONROE, WISCONSIN.

DELIVERY-WAGON.

935,121. Specification of Letters Patent. Patented Sept. 28, 1909.

Application filed May 21, 1908. Serial No. 434,181.

*To all whom it may concern:*

Be it known that I, FRED W. MILLER, a citizen of the United States, residing at Monroe, in the county of Green and State of Wisconsin, have invented certain new and useful Improvements in Delivery-Wagons; and I do declare the following to be a full, clear, and exact description of the invention, such as will enable others skilled in the art to which it appertains to make and use the same.

This invention relates to delivery wagons, and one of the principal objects of the same is to provide a wagon which shall be convenient for the delivery of goods from house to house.

Another object of the invention is to provide a wagon in which the articles to be delivered are always within the sight of the driver or delivery man, and in which he may be enabled to select the packages and deliver them without walking around to the back of the wagon to get his package before delivery. In muddy weather this is particularly disagreeable to householders in that mud and dirt are tracked into their yard or upon the front doorway.

Another object is to provide a delivery wagon in which there shall be ample room for goods to be delivered and but a single seat for a driver or delivery man, the purpose of this construction being to obviate the necessity of carrying more than a single person and utilizing all the possible space for goods.

These and other objects are attained by means of the construction illustrated in the accompanying drawings, in which:—

Figure 1:
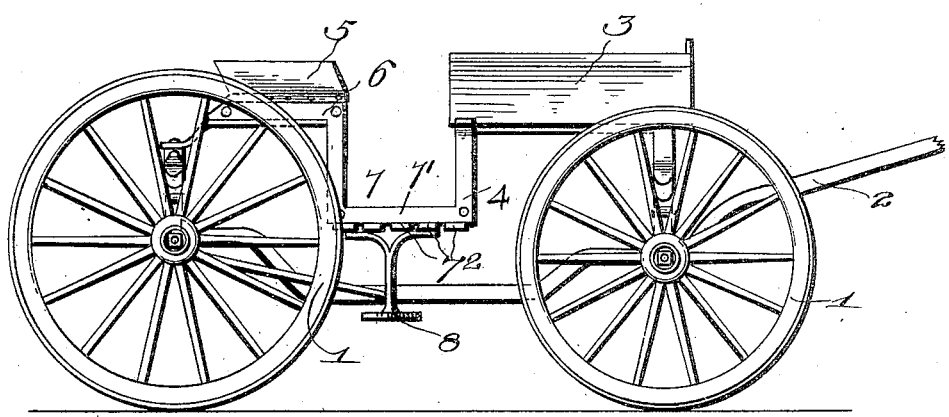
Figure 2:
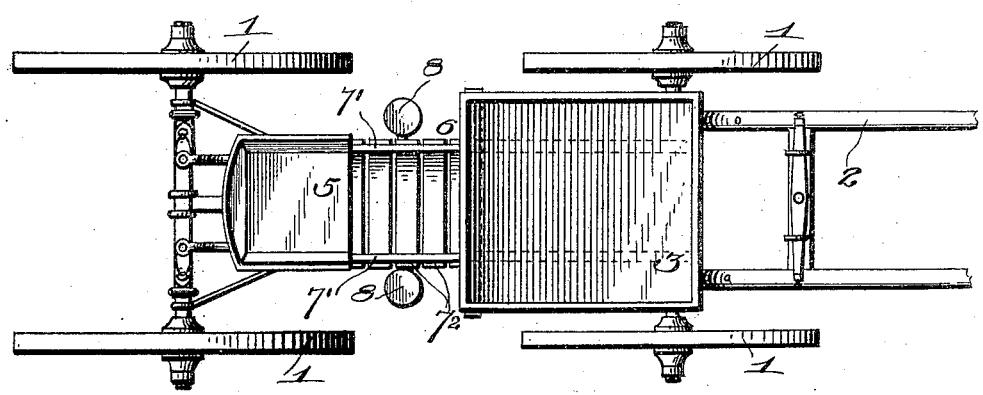

Figure 1 is a side elevation of a wagon embodying my improvements; and Fig. 2 is a plan view of the same.

Referring to the drawings for a more particular description of the invention, the numeral 1 indicates the wheels of the vehicle and 2 the shafts thereof. A box 3, to hold the goods to be delivered is supported at the front of the vehicle on an approximate level with the front wheel 1 by a pair of laterally spaced side frames 4, which are arranged at opposite sides of the vehicle and extend above and between the axles thereof. This box occupies all the space available between the two front wheels and extends as far back toward the rear of the vehicle as is practicable. A seat 5, rests upon the rear portion 6, of the side frames. These frames are provided at their central or intermediate portions with depending aproximately U-shaped portions 7, between the horizontal members 7' of which is arranged a series of slats $7^2$, forming a platform for the feet of the driver.

From the foregoing, it will be obvious that a delivery wagon made in accordance with my invention is convenient for the delivery man in that he may be able to keep his eye upon the goods to be delivered and arrange them in the order of their delivery. Moreover, the driver need not in muddy weather alight from the vehicle and walk around toward the rear end of the wagon to get the goods to be delivered but may step out upon the dismounting block and carry the goods into the house. It will be noticed that the wagon is easy of access, owing to the fact that the platform is comparatively low and by means of the step 8, is readily accessible to the driver. A single seat is provided in order that no extra room will be given for companions or those asking for accommodation in the way of a ride.

Having thus described my invention, what I claim as new and desire to secure by Letters-Patent, is:—

In a four-wheeled delivery wagon, a pair of laterally spaced side frames arranged at opposite sides of and extending above and between the front and rear axles thereof, said frames being provided with intermediate approximately U-shaped depending portions, slats extending between the horizontal members of the U-shaped portions of said frames and forming a platform for the feet of the driver, an elevated box supported at the front of the wagon upon said side frames on an approximate level with the tops of the front wheels of the vehicle, and a seat mounted upon said side frames in the rear of said box.

In testimony whereof I have hereunto set my hand in presence of two subscribing witnesses.

FRED W. MILLER.

Witnesses:
R. D. GORHAM,
HULDAH WAGNER.